United States Patent [19]

Sechrist

[11] Patent Number: 5,545,382
[45] Date of Patent: Aug. 13, 1996

[54] PROCESS AND APPARATUS FOR DISCHARGING PARTICLES AND FLUIDS FROM FLOW CHANNELS

[75] Inventor: Paul A. Sechrist, Des Plaines, Ill.

[73] Assignee: UOP, Des Plaines, Ill.

[21] Appl. No.: 345,058

[22] Filed: Nov. 25, 1994

[51] Int. Cl.$^6$ .................................................. B01J 8/12
[52] U.S. Cl. ........................ 422/216; 208/152; 208/166; 261/113; 261/114.1; 422/213
[58] Field of Search ................................. 422/213, 216; 208/152, 166; 261/113, 114.1

[56] References Cited

U.S. PATENT DOCUMENTS

| | | | |
|---|---|---|---|
| 3,883,312 | 5/1975 | Youngman | 23/288 |
| 4,357,304 | 11/1982 | Pegels et al. | 422/191 |
| 4,540,547 | 9/1985 | Schuurman | 422/216 |
| 4,568,523 | 2/1986 | Wijffels et al. | 422/191 |
| 4,590,045 | 5/1986 | Van der Wal et al. | 422/216 |
| 4,975,036 | 12/1990 | Jagannathan | 422/216 |

Primary Examiner—Timothy M. McMahon
Attorney, Agent, or Firm—Thomas K. McBride; John G. Tolomei

[57] ABSTRACT

A reactor arrangement and process for contacting a fluid reactant with a particulate catalyst in a plurality of flow channels and discharging converted reactant fluid and particles from the flow channels. The particles are discharged axially from the bottom of the flow channels into an unconfined bed of particles. Reactants are discharged in a transverse direction through the sides of the flow channels and across screen openings located a short distance above the channel outlets. A plurality of chambers regulate fluid flow through sections of the screens and prevent excessive fluid velocity in any section from holding up particle flow through the flow channels. The reactor arrangement and process of this invention is particularly useful for arrangements that may be used to operate a reactor under isothermal or other controlled temperature controlled conditions where a heat transfer fluid surrounds a plurality of tubular conduits or multiple flow channels that confine the particles and reactants.

18 Claims, 3 Drawing Sheets

PROCESS AND APPARATUS FOR DISCHARGING PARTICLES AND FLUIDS FROM FLOW CHANNELS

FIELD OF THE INVENTION

This invention relates to reactors for the conversion of a reaction fluid by contact with solid particles and the separation of the particles from the fluid after contacting.

BACKGROUND OF THE INVENTION

Systems for contacting solids and particulate material are well known and routinely employed in the processing of gases, the production of chemicals, and the refining of petroleum. The particulate materials in most cases comprise catalysts or adsorbents and the process streams are gaseous or liquid mixtures of reactants, product or streams undergoing separation.

One particularly well known method of contacting particulate material with a fluid stream retains the particulate solid material as a bed of particulate material through which the fluid stream passes. Long known advances in the methods and apparatus for contacting particulate materials with gaseous streams have employed means for moving the particulate material while the processing of the gaseous fluid is underway. A particular form of this system moves the particulate material through a contacting zone in plug flow. Individual particles rest on each other to make up the bed of particles as opposed to fluidized processes in which an upward flow of gaseous material lifts the particles to permit fluidized transport of particles through the bed of solids. Systems for intermittently or continually moving particles in a plug flow bed greatly advanced the art of reactant and particle contacting by eliminating the need to shut down process equipment in order to change out particles after they have ceased to function due to deactivation or saturation.

A multitude of arrangements with various bed geometries are known for contacting the particulate material with the fluid streams. Such arrangements include radial flow beds where particulate solids are retained in an annular ring or downflow or upflow beds where fluid streams pass through a cylindrical bed or laminar bed of particulate solids. This invention is directed to an arrangement wherein the particulate solids are retained in relatively narrow vertically extended flow channels through which the particulate solids and fluids move in a cocurrent direction. This arrangement is formed by using thin plate members to define flow channels or catalyst retaining tubes having the catalyst on the inside of the tubes. The use of plates or tubes to define flow channels are particularly important in applications that require or benefit from heating or cooling of the particulate solids and fluids within the flow channels to control the temperature of a reaction or other processing. In such arrangements, the thin plates or tubes provide a large area of heat transfer surface by which a heat transfer fluid may indirectly contact one surface of the tube or plate while the other surface retains the particulate solids and fluids. For example, concurrent indirect heat transfer in which a reactant fluid contacts a catalyst and reaction fluid can be used to supply or withdraw the heat of reaction in an endothermic or exothermic process to establish isothermal conditions in the reaction zone.

While such systems controlling temperature are known, simultaneous movement of particulate solids during the reaction and heat transfer requires the recovery of the particulate material from a large number of flow channels or tubes within a contacting vessel. Simultaneous recovery of the fluid stream from the flow channels must occur with the recovery of particulate material. The simplest method for collecting the particulate material and for recovering the fluid stream is to discharge them into an open volume or chamber at the bottom of the flow channels while also discharging the fluid stream to the same chamber of collection area.

It has been found that under some conditions the discharge of the fluid stream along with the particles into a common collection chamber can cause a phenomena generally referred to as "blow out" where the fluid stream causes fluidization at the outlet of the flow channel. The occurrence of blow out is related to the mass flux of the fluid stream passing through the particulate material in the conduit. As the mass flux increases, it increases a frictional drag force on the particulate material which increases the pressure tending to discharge the particulate material from the flow channel. Thus the mass flux of fluid through the particulate material can be maintained until a critical pressure gradient is reached at which point all of the particulate material is rapidly discharged from the conduit. The resulting relatively empty conduit then provides an unrestricted flow path for a large volume of the fluid stream to by-pass the particulate material in the other conduits. Blow out may also occur when the vertically upward flow of fluid locally around the discharge end of the conduit reaches a velocity where it fluidizes the solids in which the outlet of a flow channel is buried. Once the particles around the outlet reach fluidization, particles flow freely away from the flow channel outlet and remove all resistance to the downward pressure on the particles within the flow channel, and again, the flow channel rapidly empties.

There are known methods for preventing blow out which include providing a restriction at the bottom of the flow channel outlets. While such devices will raise the pressure gradient required from the fluid stream before blow out is reached, blow out will still eventually occur with sufficient mass flux and gradient through the conduit. Thus consideration of blow out will still impose a limitation on gas flux through the flow channels.

It is known from U.S. Pat. No. 4,975,036 to disengage gaseous fluids from particular material upstream of the outlet end of a conduit from which particulate material is discharged. This type of system incorporates a cylindrical screen section into a cylindrical conduit for transporting catalyst particles. The screen section is located well upstream of the conduit outlet and are sized to prevent passage of the catalyst particles through the screen members while permitting the escape of gases therethrough. The systems shown herein transfer the catalyst particles through extended conduits in dense phase and collect the particles in a confined conduit arrangement. Confinement of the particles prevents blow out from occurring but limits the number or complicates the arrangement of the flow channels.

Moreover, the radial discharge of fluid streams from conduits carrying particulate material are subject to another phenomena generally referred to as pinning. As the gas velocity increases, it reaches a point where the frictional forces generated by the gas passing across the particulate solids overcome the weight of gravity acting downward on the solids and hold the particulate material against the screen thereby restricting the flow of particulate material downwardly through the flow channel or conduit. In relatively small diameter conduits, those having a diameter of six inches or less, even small mounts of pining can quickly block all movement of particulate material down the flow channel.

BRIEF SUMMARY OF THE INVENTION

This invention overcomes the dual problems of blow out and pinning with an arrangement that provides multiple stages of radial discharge from a flow channel for fluid and solid particle transfer above the outlet from which the particles exit the flow channel. Each stage of radial fluid discharge controls the velocity of fluid flow exiting each stage. Controlling the flow of fluid out of each stage limits the velocity of the fluid as it exits through the sides of the flow channels from reaching a level that will result in pinning of the particulate solids. Providing multiple levels of controlled fluid discharge from the flow channels above the particle outlets insures lateral discharge of the fluid flows over a length of flow channel that will prevent pinning to the walls of the flow channels. The extended length of distribution over the perforated walls of the flow channels allows the flow channels to handle high fluid mass fluxes without either pinning or blow out occurring.

Accordingly, in an apparatus embodiment this invention comprises a plurality of partitions that define a plurality of flow channels. The partitions define a flow channel inlet at the upper end of each of the flow channels. Means are provided for communicating particulate material and reactants to the flow channel inlets. The partitions also define flow channel outlets at a lower end of each of the flow channels. A vessel defines a collection chamber that contains the plurality of flow channel outlets. Means are provided for withdrawing the particulate material from the flow channel outlets and collecting the particulate material in the collection chamber. A first baffle defines at least a portion of a first fluid chamber above the outlets and a second baffle defines at least a potion of a second fluid chamber above the outlets and below the first baffle. A first perforated section of the partition communicates the first chamber with a first vertical section of the flow channels and a second perforated portion of the partitions communicates the second chamber with a second vertical section of the flow channels. Means are provided for withdrawing and regulating fluid flow out of the first and second chambers.

In a more specific embodiment, this invention is a reactor arrangement for contacting a reactant fluid with catalyst particles and, at least intermittently, withdrawing the catalyst particles from the reactor and indirectly heat exchanging the reactant fluid and catalyst particles with a heat exchange fluid. The apparatus comprises a vessel that contains a plurality of first partitions extending vertically and defining a plurality of vertically extended flow channels for reactants and catalyst particles. The first partitions define channel inlets at the upper end of each of the flow channels. Means are provided for passing catalysts and the reactants into the channel inlets. A second partition extends transversely between the channels and divides the flow channels into a heat exchange portion and an outlet portion. The vessel and the heat exchange portion of the flow channels defines a heat exchange chamber. Means are provided for passing a heat exchange fluid through the heat exchange chamber. The first baffle defines a first outlet chamber surrounding the outlet portion of the channels at a first vertical location. A second baffle defines a second outlet chamber surrounding the heat exchange portion of the flow channels at a second vertical location below the first vertical location. A screen surface in the partition at the first and second vertical locations communicates the flow channel with the first and second outlet chambers. The first partitions also define a channel outlet at a location below the second vertical location for discharging catalyst from the flow channels. A collection chamber receives catalyst and reactant products from the flow channel outlets. The first and second baffles define restriction orifices for communicating the first and second outlet chambers with the collection chamber while restricting the flow of reactant products across the screen surface. Means are provided for withdrawing catalyst and reactant products from the collection chamber.

In another embodiment this invention is a method for separating fluids from particulate solids and a process for contacting the fluid stream with particulate solids and at least periodically withdrawing the particulate solids. The method retains particulate solids in vertical flow channels and at least periodically withdraws particulate material from a particle outlet of the flow channels. In the method, fluid passes through the flow channels and at least a portion is discharged from the flow channels into a chamber through a screen that retains the particulate material. The discharging of the particulate material takes place at least two locations both located above the particle outlet. In the method the flow of fluids out of each chamber is restricted to maintain a velocity through the screens that is less than the velocity that will cause pinning of particulate solids against the screen section. The fluids from the chambers are recovered along with any other fluids materials passing out of the outlets.

This invention can be practiced with a variety of different flow channel arrangements and chamber arrangements. The following description describes a limited number of alternative arrangements for the apparatus and the method of this invention. Those skilled in the art will be aware of other arrangements that can be employed using the broad principals of this invention from the additional details and descriptions that follow.

DETAILED DESCRIPTION OF THE INVENTION

This invention applies to arrangements for contacting particulate material with a fluids. This type of contacting maintains the particulate solids in a plurality of dense compact beds. The particulate solids may be any material that will maintain its shape under the specific conditions of contacting that take place within the flow channels through which the solid particles pass. The particulate material is not generally limited in size but will, in most cases, have a nominal diameter of ¼ inch or less. Particularly preferred particles will have a relatively uniform diameter.

A fluid stream contacts the solid particulate material that is retained in the channels. The fluid is preferably in gaseous phase. Additional fluid streams may be employed to effect indirect heat exchange with the partitions that form the catalyst retaining flow channels. Specific hydrocarbon conversion processes that may benefit from temperature control are: catalytic dehydrogenation of paraffins, reforming of naphtha feed streams, aromatization of light hydrocarbons and the alkylation of aromatic hydrocarbons. This invention is further described in the context of the figures which show the preferred form of the invention as a reactor arrangement for contacting catalyst particles with a gaseous phase reactant stream.

Figure 1:
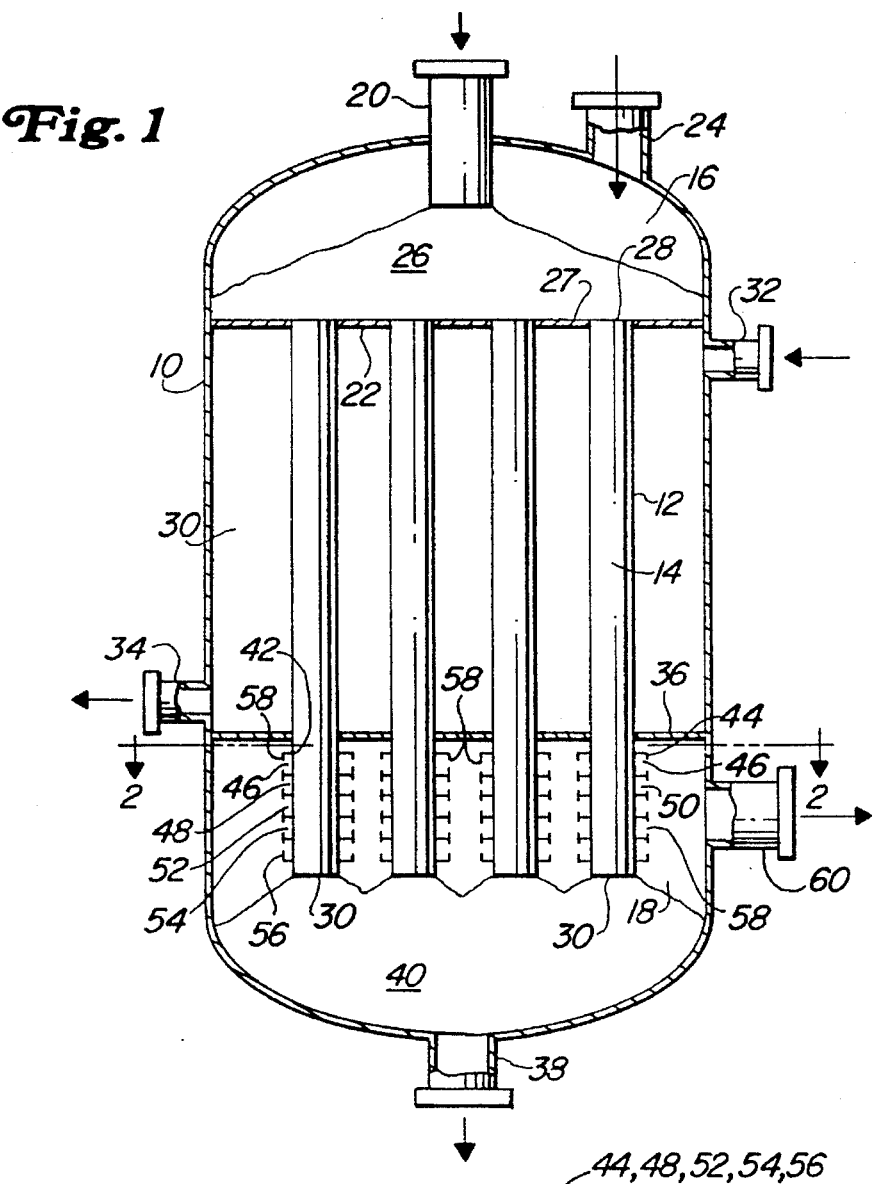
FIG. 1 is a vertical elevation showing a cross section and the internals of a flow channel and baffle arrangement of this invention.

Looking at FIG. 1, a reactor vessel 10 houses a plurality of tubes 12 that serve as partitions to define flow channels 14. How channels 14 have a circular cross section. Above the tubes 12, reactor 10 encloses a chamber 16 for the distribution of solid particles in the form of catalyst to the tubes and the addition of gaseous reactants for passage through the catalyst in flow channels 14. The catalyst passes through a nozzle 20 and rests in chamber 16 on a transversely extended partition 22. Reactants pass into chamber 16 through a nozzle 24 and pass through the bed of catalyst 26. Catalyst bed 26 retains an inventory of catalyst particles that maintains a constant supply of catalyst to the tubes 14. As catalyst is withdrawn from the bottom of the reactor 10 through a catalyst withdrawal nozzle 38 catalyst particles pass from bed 26 into channels 14 primarily under gravity flow with some assistance of gases at the inlet of the tubes.

Chamber 16 distributes both catalyst and reactants into the flow channels 14 of the reactor vessel. Tubes 14 each define an inlet 28 at partition plate 22. The inlets receive both catalyst and a gaseous reactant from chamber 16. Inlets 28 feed the catalyst particles and reactants into the vertically extended flow channels 14.

The middle of the reactor defines a heat exchange chamber 30. Heat exchange chamber 30 surrounds the exterior of tubes 12. The surrounded portion of tubes 12 provide a heat transfer surface for the heating or cooling of the catalyst and reactants in flow channels 14. Heat exchange medium enters the chamber 30 through a nozzle 32 and exits the chamber 30 through a nozzle 34. Another transversely extended partition 36 defines the bottom of the heat exchange chamber 30 and separates the heat exchange portion of tubes 12 from the outlet portion of tubes 12.

Figure 2:
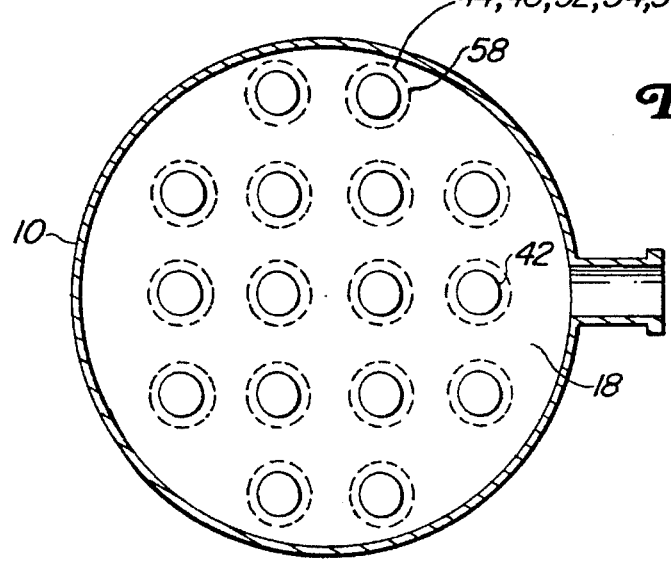
FIG. 2 is a cross-section of FIG. 1 taken at section 2—2.

The bottom of the reactor vessel forms a collection chamber 18. An outlet portion of tubes 12 extend below partition 36 into collection chamber 18. As shown in FIG. 2, collection chamber 18 contains a plurality of tubes. Each tube 12 defines an outlet 31 at its lower most portion. The outlets 31 all discharge catalyst particles at a common elevation. Discharged catalyst collects in a bed 40. The direct discharge of outlets 31 into the open collection chamber 18 provide a compact design that minimizes the necessary height of the chamber from outlets 31 to catalyst nozzle 38. As catalyst exits tubes 12 through outlets 31, it maintains bed 40 as a dense bed up to the top of outlet 31. The dense bed of catalyst up to outlets 31 maintains flow channels 14 full of catalyst over their entire length.

In the practice of this invention, the discharge of the gaseous reactants occurs, at least in part, through the sides of tubes 12. In the outlet portion located below partition 36, each tube has a perforated portion 42. Perforated portion 42 usually comprises a screen member. At least two chambers for receiving the reactant fluid surround each perforated portion 42. An upper baffle 44 in the form of a U-shaped channel member encircles the exterior wall of tube 12 and forms an upper chamber 46 for regulating the fluid flow out of an upper section of the perforated portion 42. Directly below chamber 46 another U-shaped channel member baffle 48 surrounds another section of the perforated portion 42 to enclose another chamber 50. The remaining portion of the perforated section of conduit 12 has additional U-shaped channel shaped members providing baffles 52, 54, and 56 that surround the tubes and define chambers. Preferably the flow channels extend only a short distance from where the perforated section stops to the end of the channel at outlet 31. The length of channel above the outlets 31 and below the perforated section is preferably less than five flow channel diameters from the opening 31 and more preferably less than one flow channel diameter from the opening 31. Typically the vertical length of the perforated section 42 surrounded by baffles will exceed the length of flow channel 14 between outlet 31 and the bottom of the perforated section 42. Orifice openings 58 defined in the sides of the flow channels provide means for regulating the flow of reactants out of the individual chambers associated with each flow channel. Reaction gases from the orifice openings 58 as well as any gases that pass outwardly through outlet 31 enter collection chamber 18 and exit through a product outlet nozzle 60.

FIG. 2 shows the arrangement of multiple tubes 12 for reactor 10 at the outlet portion of the tubes across the perforated portions 42. The baffles 44, 48, 52, 54, and 56 surround the entire periphery of the perforated portions 42. Orifice openings 58 are evenly distributed around the circumference of each baffle to restrict reactant flow across the perforated portion. The restriction of flow through each perforated portion by orifices 58 prevents the gas velocity across the perforated portion from approaching that which would cause pinning of the catalyst particles against the openings of the perforated portion. Preferably, the orifice openings 58 have a flow area that will permit a maximum gas flow that is less than that would cause pinning across the perforated portion.

Figure 3:
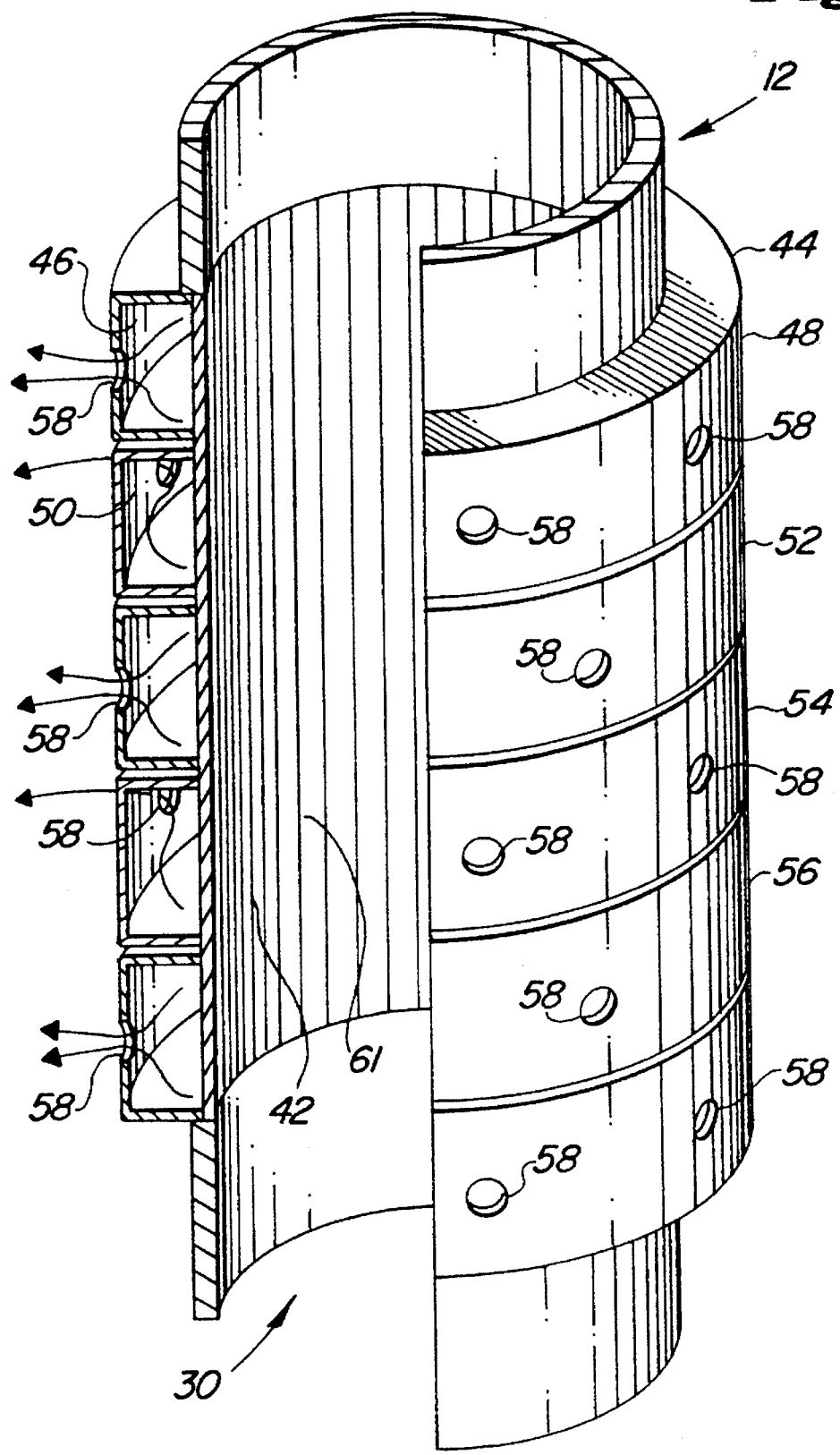
FIG. 3 is an isometric view showing the bottom of a tubular conduit from FIG. 1 in partial cross-section.

As shown in FIG. 3, the perforated portion ordinarily consists of screen in the form of profile wire 61 that defines spaces between the wires and permits gas to flow out of the tubes 12 but retain the catalyst particles. U-shaped baffles 44, 48, etc., are welded directly to the screen of perforated section 42. The screen sections are sealed between baffle sections by welding of the U-shaped baffles to the screen.

Each chamber 44, 48, etc., is limited in the amount of reactant flow permitted to flow therethrough by the pressure drop through restriction orifices 58. Restriction orifices 58 thereby create a total flow area across screen 42 in to each baffle that greatly exceeds the flow area of the restriction orifices defined by that baffle. It is preferred in the practice of this invention that the majority of the reactant gas exit tubes 12 laterally through the screen 42 of the flow channels instead of the outlet 31. By using two or more chambers separated by baffles, the total reactant gas velocity across the screen section 42 is kept relatively low, typically in a range of from 0.1 to 1.0 ft/sec which is well below the normal pinning velocity which is typically in a range of from 1.0 to 5.0 ft/sec. Orifices 58 are also sized slightly smaller than that needed to keep the gas velocity across perforated portion 42 below that which will cause pinning. A velocity greater than that which would cause pinning may be permissible since the downward component of force exerted by the gas through the catalyst particles assists gravity flow by pushing the catalyst particles downward and raises the gas velocity necessary to cause pinning. The addition of extra baffles provide additional stages of reaction gas regulation that can reduce total pressure drop and the resulting gas velocity across any given screen section may be kept in any range that will provide a suitable factor of safety against pinning.

Figure 4:
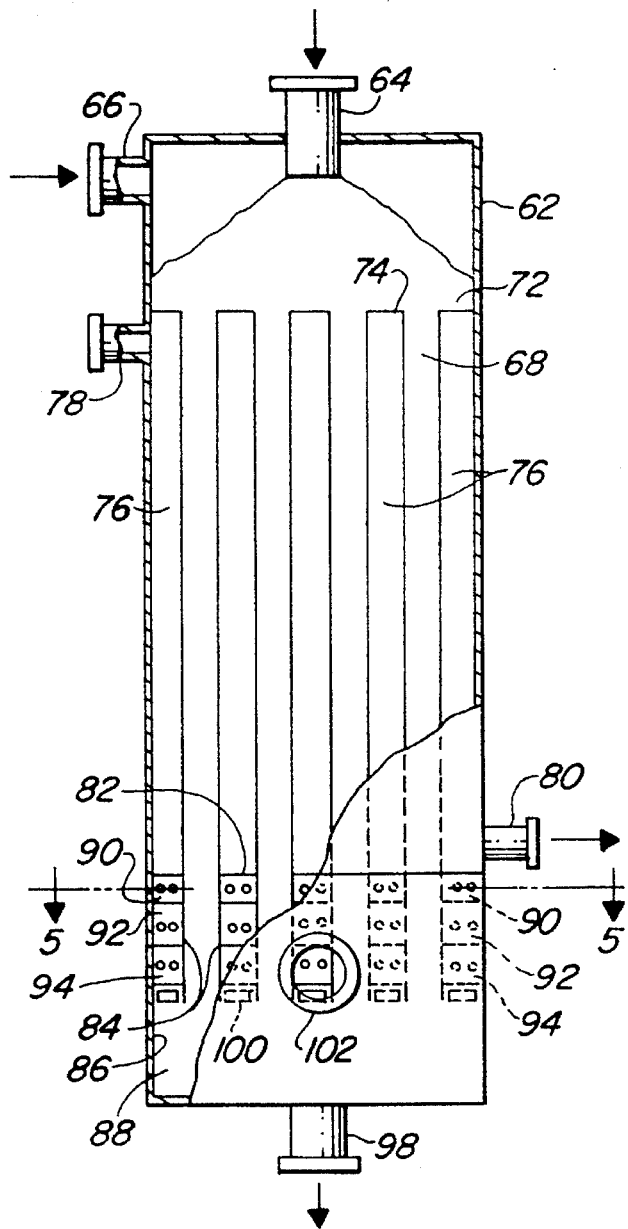
FIG. 4 is an elevation view of an alternative flow channel and vessel arrangement of this invention showing a partial cross-section.

The flow channels and baffles may be arranged in other configuration that still permit a compact arrangement for discharging particles from the ends of the flow channels while avoiding the problems of blow out or pinning. FIG. 4 shows an arrangement that uses vertically oriented plates 70 to define rectangular flow channels 68 in a reactor 62 having a box configuration. Catalyst particles enter the top of reactor 62 by a nozzle 64 for gravity transport therethrough. Reactant gases enter the top of reactor 62 through a nozzle 66. Catalyst and gases flow into the flow channel 68 defined by flat plates 70. Plates 70 together with a transverse partition 72 define inlets 74 for the catalyst and gases to enter flow channel 68.

Plates 70 are preferably thin plates that permit rapid heat transfer between heat transfer channel 76 and the catalyst and gas flow channel 68. The heat transfer fluid enters the channel 76 through a nozzle 78 and passes from channel to channel through a distribution chamber at the front and the back of the reactor (not shown). The heat transfer fluid exits the chamber 76 through distribution flow channels (not shown) and a nozzle 80. Transversely extending baffles 82 divide the flow channel 68 into an upper heat transfer portion and a lower gas outlet portion.

In the gas outlet portion reactant gases are discharged laterally across perforated sections 84 of the plates 70. The catalyst particles and the remainder of any reactant gas are discharged downwardly through an outlet 86, defined by the bottom of plate 70, into a catalyst bed 88. The perforated portions 84 disengage gases laterally into gas collection chambers 90, 92, and 94. The quantity of reactant gas flowing out of each gas collection chamber is regulated by orifice openings 96. The collected catalyst particles exit the bottom of reactor 62 through a nozzle 98. Reactant gases that pass through outlets 86 disengage from the catalyst particles and pass through ports 100 where they are joined with reacting gases from orifice openings 96 for withdrawal from the reactor vessel through outlet 102.

Figure 5:
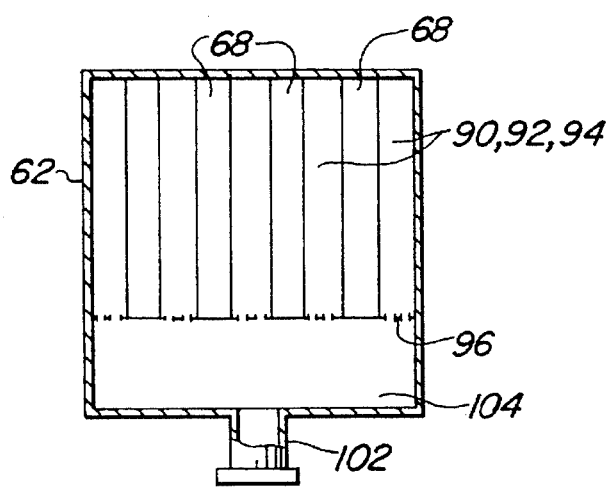
FIG. 5 is a cross-section of the arrangement shown in FIG. 4 taken at section 5—5.

Reactant gases from orifice openings 96 pass into a common collection chamber. FIG. 5 shows a collection chamber 104 in communication with orifice openings 96. In addition, collection chamber 104 also communicates with the outlet ports 100 that deliver disengaged reactant gas from bed 88 to nozzle 102.

What is claimed is:

1. An apparatus for contacting a fluid stream with particulate solids, said apparatus comprising:

a first plurality of partitions defining a plurality of flow channels;

a flow channel inlet defined by said partitions at an upper end of each of said flow channels;

means for communicating particulate material and reactants to said flow channel inlets;

a flow channel outlet defined by said partitions at a lower end of each of said flow channels;

a vessel containing said plurality of flow channel outlets and defining a collection chamber;

means for withdrawing particulate material from said flow channel outlets for collection in said collection chamber;

a first baffle defining at least a portion of a first fluid chamber above said outlets;

a second baffle defining at least a portion of a second fluid chamber above said outlet and below said first baffle;

a first perforated portion of said partition communicating said first chamber with a first vertical section of said flow channels;

a second perforated portion of said partition communicating said second chamber with a second vertical section of said flow channels;

means for withdrawing fluid and regulating fluid flow out of said first and second chambers.

2. The apparatus of claim 1 wherein said partitions comprise tubes and said flow channels have a circular cross section.

3. The apparatus of claim 1 wherein said partitions comprise plate members and define vertically extended flow channels.

4. The apparatus of claim 2 wherein said first baffle comprises a first U-shaped channel member that encircles said first vertical section of said tube and said second baffle comprises a second U-shaped channel member that encircles said second vertical section of said tube and said first and second members each define a restricted opening for providing said means for withdrawing fluid and regulating fluid out of said first and said second chambers.

5. The apparatus of claim 1 wherein said first and second chambers communicate with said collection chamber for the withdrawal of fluid from said collection chamber.

6. The apparatus of claim 1 wherein said first and second baffle comprise plates that define a single first chamber and a single second chamber and a plurality of said flow channels communicate with said single first chamber and said single second chamber.

7. The apparatus of claim 1 wherein the vertical length of said flow channel below said second chamber is less than the vertical length of either said first vertical section or said second vertical section.

8. The apparatus of claim 1 wherein said first and second perforated portions are defined by a continuous section of screen.

9. The apparatus of claim 6 wherein said first chamber, said second chamber and an upper portion of said collection chamber communicate with a third chamber for the withdrawal of fluid from said third chamber.

10. A reactor arrangement for contacting a reactant fluid with catalyst particles, at least intermittently withdrawing catalyst particles from said reactor and indirectly heat exchanging said reactant fluid and catalyst particles with a heat exchange fluid, said reactor comprising:

a vessel containing a plurality of first partitions extending vertically and defining a plurality of vertically extended flow channels for said reactants and catalyst particles;

flow channel inlets defined by said first partitions at the upper end of each of said flow channels;

means for passing said catalyst and reactants into said flow channel inlets;

a second partition extending transversely between said flow channels and dividing said flow channels into a heat exchange portion and an outlet portion;

a heat exchange chamber defined by said vessel and the heat exchange portion of said flow channels and means for passing a heat exchange fluid through said heat exchange chamber;

a first baffle defining a first outlet chamber surrounding said outlet portion of said flow channels at a first vertical location;

a second baffle defining a second outlet chamber surrounding said outlet portion of said flow channels at a second vertical location below said first vertical location;

a screen surface in said partition at said first and said second vertical locations for communicating said flow channel with said first and second outlet chambers;

a flow channel outlet defined by said first partitions at a location below said second vertical location for discharging catalyst from said flow channels;

a collection chamber for receiving catalyst and reactant products from said flow channel outlets;

restriction orifices defined by said first and second baffles for communicating said first and second outlet chambers with said collection chamber and restricting the flow of reactants products across said screen surface; and, means for withdrawing catalyst and reactant products from said collection chamber.

11. The apparatus of claim 10 wherein said first partitions comprise tubes and said flow channels have a circular cross section.

12. The apparatus of claim 10 wherein said first partitions comprise plate members and define vertically extended flow channels.

13. The apparatus of claim 12 wherein said first baffle comprises a first U-shaped channel member that encircles said tube at said first vertical location and said second baffle comprises a second U-shaped channel member that encircles said tube at said second vertical location and said first and second members define a restricted opening for providing said means for withdrawing and regulating fluid out of said first and second outlet chambers.

14. The apparatus of claim 10 wherein the vertical length of said flow channel below said second chamber is less than the vertical length of either said first outlet chamber or said second outlet chamber.

15. A method of separating fluids from particulate solids in a process for contacting said fluid stream with particulate solids and at least periodically withdrawing catalyst particulate solids, said method comprising:

retaining particulate solids in a vertical flow channel and at least periodically withdrawing particulate material from a particle outlet of said flow channel;

passing a process fluid through said flow channel and discharging at least a portion of said process fluid from said flow channel at least two locations above said particle outlet into a chamber through a screen that retains said particulate material;

restricting the flow of process fluid out of each chamber by baffle means to maintain a velocity through said screens that is less than the velocity that will cause the pinning of particulate solids against said screen section; and, recovering process fluid from said chambers.

16. The process of claim 15 wherein said process fluid and particulate solids are indirectly heat exchanged with a heat exchange fluid.

17. The process of claim 15 wherein said process fluid comprises a reactant mixture and said particulate solids comprise a catalyst.

18. The process of claim 15 wherein said process fluid comprises a gas.

* * * * *